US012738766B2

(12) United States Patent
Lin et al.

(10) Patent No.: US 12,738,766 B2
(45) Date of Patent: Sep. 15, 2026

(54) TRANSFORMER MONITORING MANAGEMENT SYSTEM

(71) Applicant: Fortune Electric Co., Ltd., Taoyuan City (TW)

(72) Inventors: Chia-Ching Lin, Taoyuan City (TW); Ching-Min Chen, Taoyuan City (TW); Chia-Tai Hsu, Taoyuan City (TW)

(73) Assignee: FORTUNE ELECTRIC CO., LTD., Taoyuan City (TW)

( * ) Notice: Subject to any disclaimer, the term of this patent is extended or adjusted under 35 U.S.C. 154(b) by 341 days.

(21) Appl. No.: 18/636,219

(22) Filed: Apr. 15, 2024

(65) Prior Publication Data

US 2025/0167588 A1 May 22, 2025

(30) Foreign Application Priority Data

Nov. 21, 2023 (TW) ................................ 112144849

(51) Int. Cl.

*H02J 13/12* (2026.01)
*H01F 27/40* (2006.01)
*H02J 13/10* (2026.01)
*H02J 13/13* (2026.01)
*H02J 13/333* (2026.01)

(52) U.S. Cl.

CPC ............ *H02J 13/12* (2026.01); *H01F 27/402* (2013.01); *H02J 13/10* (2026.01); *H02J 13/1335* (2026.01); *H02J 13/333* (2026.01)

(58) Field of Classification Search

None

See application file for complete search history.

(56) References Cited

U.S. PATENT DOCUMENTS

| | | | | |
|---|---|---|---|---|
| 12,487,143 | B1 * | 12/2025 | Malan | G01M 3/02 |
| 2022/0254565 | A1 * | 8/2022 | Anderson | H02H 7/04 |

* cited by examiner

*Primary Examiner* — Sean Shechtman

(74) *Attorney, Agent, or Firm* — Li & Cai Intellectual Property Office

(57) ABSTRACT

A transformer monitoring management system includes multiple smart regulating transformers and a backend management system, and is applicable to a smart gird that includes a transmission and distribution network and a communication infrastructure. Each smart regulating transformer includes a transformer body coupled to the transmission and distribution network, a voltage regulator, and a monitoring terminal. A detecting module is disposed on the transformer body to obtain operation status data that includes a voltage and a current of a low-voltage side. The voltage regulator is coupled to the transformer body, so that the voltage of the low-voltage side is compensated to be within a rated voltage range. The monitoring terminal is coupled to the detecting module for collecting the operation status data and generating an abnormal status message, and transmits the operation status data or the abnormal status message to the backend management system through the communication infrastructure.

10 Claims, 7 Drawing Sheets

TRANSFORMER MONITORING MANAGEMENT SYSTEM

CROSS-REFERENCE TO RELATED PATENT APPLICATION

This application claims the benefit of priority to Taiwan Patent Application No. 112144849, filed on Nov. 21, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a monitoring management technology of networked devices, and more particularly to a transformer monitoring management system that integrates an existing communication infrastructure and is particularly applicable to a smart regulating transformer having advanced perception and an active voltage compensation function.

BACKGROUND OF THE DISCLOSURE

An electrical grid is an important infrastructure of a nation. In order to ensure operation safety and effectiveness of the electrical grid, maintaining a normal and stable operation of a transformer is first and foremost. Hence, status diagnosis, maintenance, management, and repair of the transformer have always been issues that receive much attention in the electricity sector or the energy sector.

With the development and popularization of a smart grid, management and data transmission of an electric power system have become more and more important. As a result, in addition to promoting installation of a smart meter, communication integration of the smart meter and a backend information system is also reinforced, so as to establish a core infrastructure of the smart grid. Apart from the smart meter, the transformer is also an important device of the smart grid. The main function of the transformer is to enable electric power to be stably transmitted to a terminal. However, the transformer can be substantial in quantity and numerous in variety. In Taiwan, there are currently over one million distribution transformers of various types that operate in the electric power system. Therefore, actions such as management of devices, operation monitoring, and malfunction diagnosis can consume considerable human resources and time. If an emergency occurs, obtaining a real-time report and a real-time resolution is also very unlikely, which may result in occurrence or even expansion of damage.

SUMMARY OF THE DISCLOSURE

In response to the above-referenced technical inadequacies, the present disclosure provides a transformer monitoring management system. The transformer monitoring management system can sufficiently utilize an existing communication infrastructure to transmit operation status data and relevant messages of a transformer body to a backend management system for monitoring and effective use, and can integrate an active voltage compensation technology to decrease voltage variations of an electric power system, thereby improving the quality of electric power.

In order to solve the above-mentioned problems, one of the technical aspects adopted by the present disclosure is to provide a transformer monitoring management system, which is applicable to a smart gird that includes a transmission and distribution network and a communication infrastructure. The transformer monitoring management system includes a plurality of smart regulating transformers and a backend management system. Each one of the smart regulating transformers includes a transformer body, a voltage regulator, and a monitoring terminal. The transformer body has a high-voltage side and a low-voltage side, and the high-voltage side is coupled to the transmission and distribution network. A detecting module is disposed on the transformer body to obtain operation status data of the transformer body, and the operation status data includes a voltage and a current of the low-voltage side. The voltage regulator is coupled to the low-voltage side, and adopts a predetermined regulation to regulate the voltage of the low-voltage side once or more than once, so that the voltage of the low-voltage side is compensated to be within a rated voltage range. The monitoring terminal is coupled to the detecting module, so as to collect the operation status data and generate an abnormal status message based on the operation status data. The abnormal status message includes an abnormal electrical load status or an overload status of the transformer body. The monitoring terminal in each one of the smart regulating transformers is configured to transmit the operation status data or the abnormal status message to the backend management system through the communication infrastructure.

In one of the possible or preferred embodiments, the predetermined regulation is not greater than 5%, and the rated voltage range is within +1% of a rated voltage.

In one of the possible or preferred embodiments, the monitoring terminal is coupled to the voltage regulator to collect voltage regulation data, and transmits the voltage regulation data to the backend management system through the communication infrastructure.

In one of the possible or preferred embodiments, in each one of the smart regulating transformers, the operation status data obtained by the detecting module further includes a temperature of a copper head of the transformer body, and the abnormal status message generated by the monitoring terminal based on the operation status data further includes an amount of an overload current or an overload ratio of the transformer body.

In one of the possible or preferred embodiments, in each one of the smart regulating transformers, the transformer body includes an insulating oil, and the operation status data obtained by the detecting module further includes an oil temperature of the insulating oil. The abnormal status message generated by the monitoring terminal based on the operation status data further includes an abnormal oil temperature status of the transformer body.

In one of the possible or preferred embodiments, the operation status data obtained by the detecting module further includes an oil level of the insulating oil, and the abnormal status message generated by the monitoring terminal based on the operation status data further includes an abnormal oil level status of the transformer body.

In one of the possible or preferred embodiments, the backend management system is configured to activate a reporting operation based on the abnormal status message.

In one of the possible or preferred embodiments, the monitoring terminal in each one of the smart regulating transformers includes a first communication module, the communication infrastructure includes a headend subsystem, the headend subsystem includes a second communication module and a third communication module, and the backend management system includes a fourth communication module. A first communication protocol and a second communication protocol that is different from the first communication protocol are implemented in the communication infrastructure, the first communication module of the monitoring terminal in each one of the smart regulating transformers communicates with the second communication module of the headend subsystem based on the first communication protocol, and the third communication module of the headend subsystem communicates with the fourth communication module of the backend management system based on the second communication protocol.

In one of the possible or preferred embodiments, the backend management system is configured to display the operation status data and position messages of the transformer bodies on an electronic map.

In one of the possible or preferred embodiments, the monitoring terminal in each one of the smart regulating transformers includes a positioning module, so as to obtain a position message of the transformer body.

Therefore, in the transformer monitoring management system provided by the present disclosure, by virtue of "the voltage regulator being coupled to the low-voltage side of the transformer body and adopting the predetermined regulation to regulate the voltage of the low-voltage side once or more than once, so that the voltage of the low-voltage side is compensated to be within the rated voltage range," "the monitoring terminal being coupled to the detecting module of the transformer body, so as to collect the operation status data of the transformer body obtained by the detecting module and generate the abnormal status message," and "the monitoring terminal being configured to transmit the operation status data or the abnormal status message to the backend management system through the communication infrastructure," maintenance efficiency for operation of a transformer can be improved, and effectiveness of the communication infrastructure can be maximized.

In addition, the monitoring terminal can transmit the operation status data (i.e., monitoring data) of the transformer to the backend management system in a manner that is compatible with a communication standard or data transmission of the communication infrastructure (e.g., an advanced metering infrastructure), so as to remotely monitor operation status changes of the transformer in real time and instantly and preliminarily determine causes of abnormality. In this way, when operation of the transformer is abnormal, a maintenance time or a troubleshooting time can be shortened, thereby preventing damage to the transformer body and avoiding occurrence or expansion of the damage.

Furthermore, the backend management system can manage and process a substantial amount of long-term data from different transformer bodies, and can gradually establish a monitoring data database of the transformer body, so that a device status of the transformer body can be fully grasped. In the future, possible causes of malfunction can also be detected by big data analytics, and a fault mode curve can be established, so as to achieve the goal of trend-driven management.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
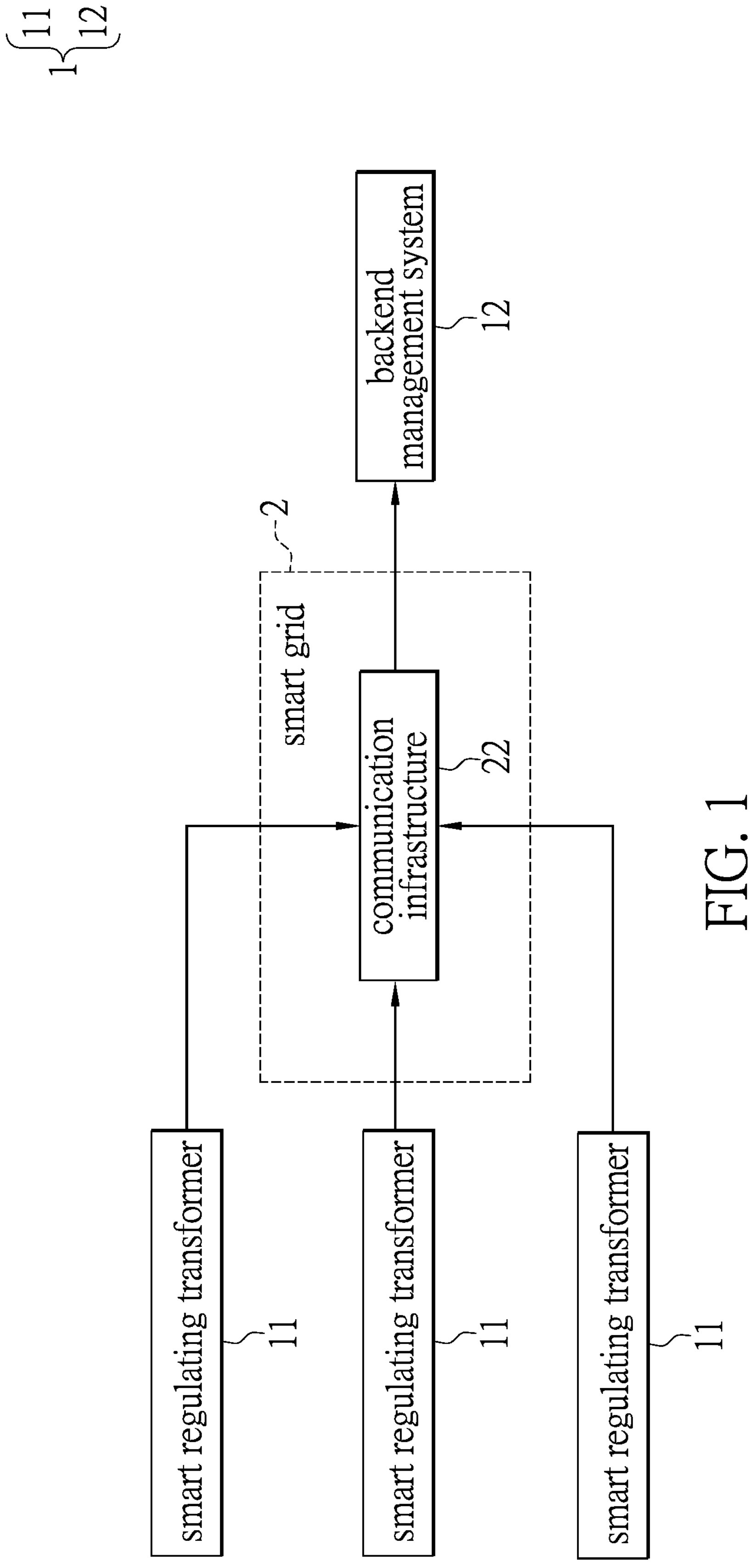
FIG. 1 is a schematic diagram illustrating an overall structure of a transformer monitoring management system according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
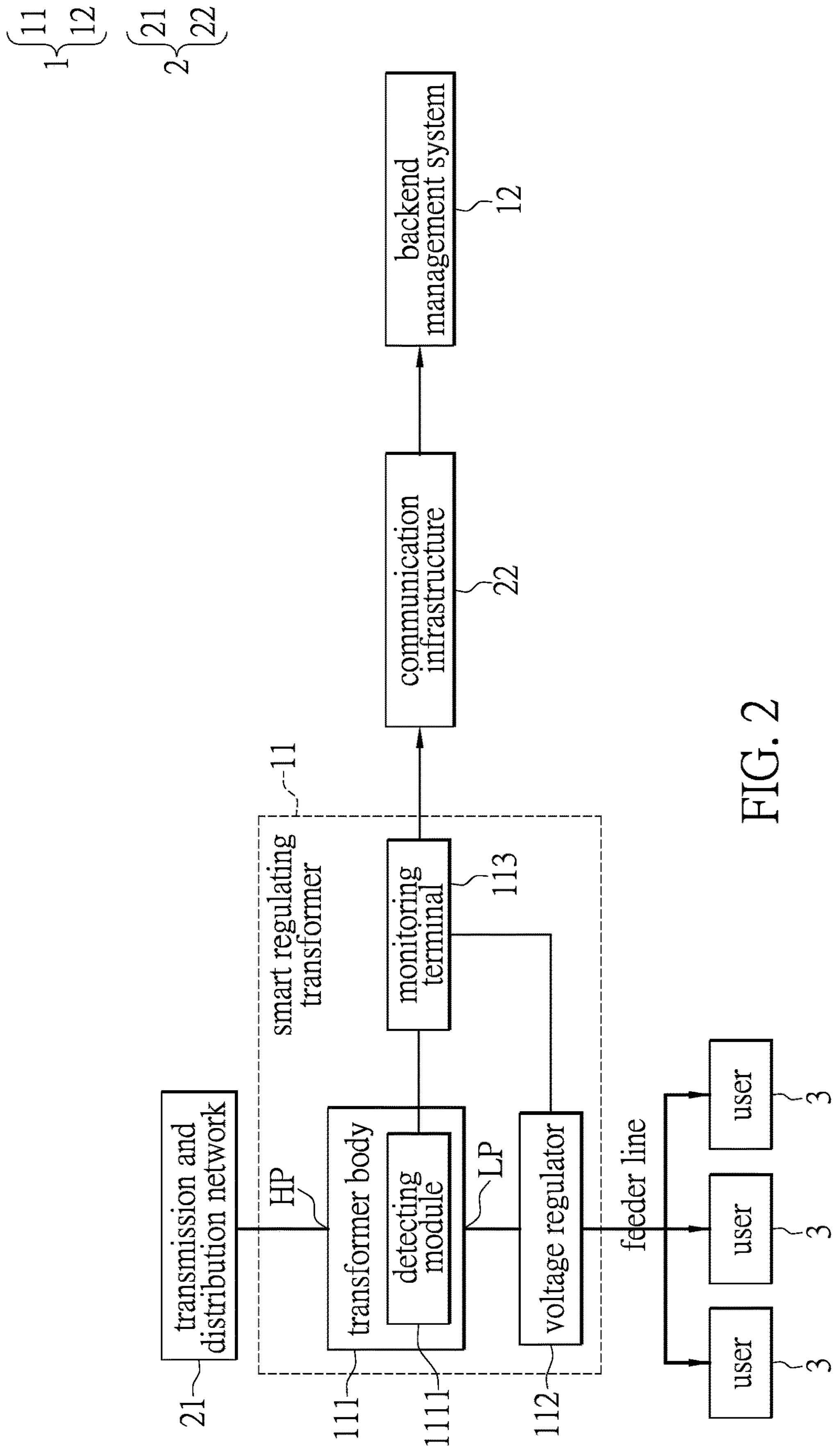
FIG. 2 is a schematic diagram illustrating another overall structure of the transformer monitoring management system according to the present disclosure.

Reference is made to FIG. 1 and FIG. 2. An embodiment of the present disclosure provides a transformer monitoring management system 1, which includes a plurality of smart regulating transformers 11 and a backend management system 12. As shown in FIG. 1 and FIG. 2, the transformer monitoring management system 1 is applicable to a smart gird 2, and the smart grid 2 mainly includes a transmission and distribution network 21 and a communication infrastructure 22. During use, the smart regulating transformers 11 are disposed between electrical loads (such as the transmission and distribution network 21 and users 3), so that high-voltage electric power that is transmitted to an electricity usage area can be converted into low-voltage electric power before being supplied to the users 3. Operation status data and relevant messages of the smart regulating transformers 11 can be transmitted to the backend management system 12 through the communication infrastructure 22 for monitoring and effective use. Accordingly, the costs for integration of system provisioning and backend information can be reduced, and use effectiveness of an existing communication infrastructure can be maximized. The communication infrastructure can be an advanced metering infrastructure (AMI), but is not limited thereto.

Specifically, in the transformer monitoring management system 1 of the present disclosure, the operation status data of the smart regulating transformers 11 can undergo data conversion and standardization, and is then transmitted to the backend management system 12 in a manner that is compatible with the standard or data transmission (e.g., data packet) of the existing communication infrastructure 22. In this way, a transformer body can be monitored from the backend management system 12, and causes of abnormality can be instantly and preliminarily determined, so as to shorten a troubleshooting time or a maintenance time and improve maintenance efficiency for operation of the transformer body. Hence, damage to the transformer body can be prevented, and occurrence or expansion of the damage can be avoided.

Figure 5:
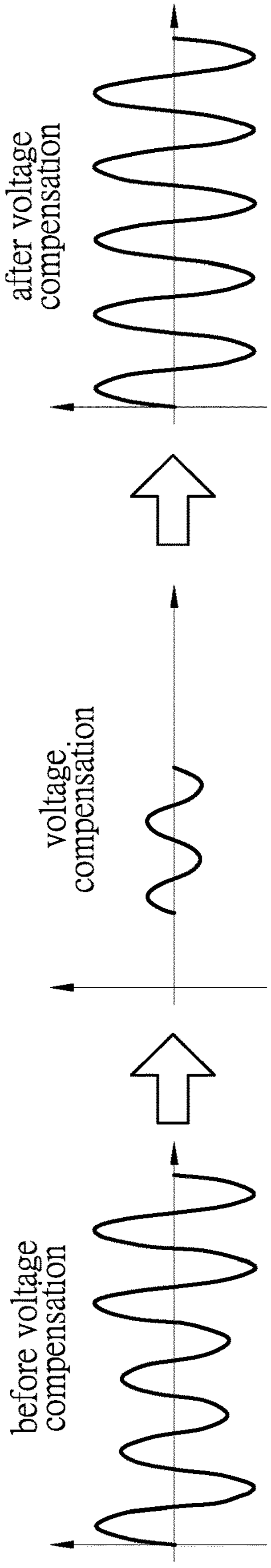
FIG. 5 is a schematic diagram illustrating an active voltage compensation function of a smart regulating transformer of the transformer monitoring management system during a sudden voltage rise according the present disclosure.
Figure 6:
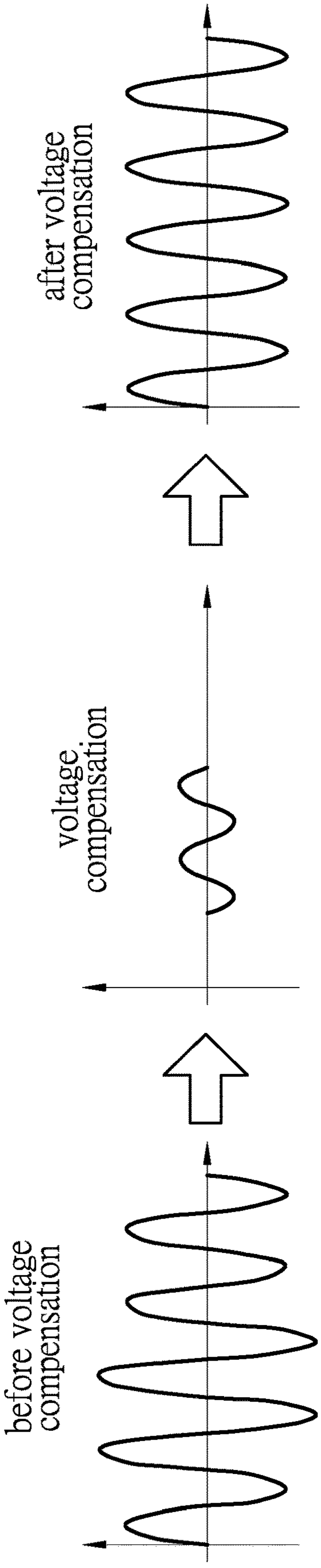
FIG. 6 is a schematic diagram illustrating the active voltage compensation function of the smart regulating transformer of the transformer monitoring management system during a sudden voltage drop according the present disclosure.

It should be noted that the smart regulating transformer 11 has advanced perception, and can detect all status parameters that may affect a normal operation of the transformer body in real time, so as to facilitate early detection of abnormality. In addition, the smart regulating transformer 11 has an active voltage compensation function (automatic voltage regulation function), and is capable of performing compensations (i.e., compensating insufficient or excessive voltages, as shown in FIG. 5 and FIG. 6) in response to voltage variations (e.g., a sudden voltage rise or a sudden voltage drop) of the transmission and distribution network 21. Accordingly, a stable voltage can be supplied to the backend users 3, and the stability and the elasticity of demand of an electric power system can be improved. Relevant technical details will be illustrated below.

As shown in FIG. 2, the smart regulating transformer 11 includes a transformer body 111, a voltage regulator 112, and a monitoring terminal 113. A high-voltage side HP of the transformer body 111 is coupled to the transmission and distribution network 21, and a detecting module 1111 is disposed on the transformer body 111 to obtain operation status data of the transformer body 111. The operation status data at least includes a voltage and a current of a low-voltage side LP. The voltage regulator 112 is coupled to the low-voltage side LP of the transformer body 111, and adopts a predetermined regulation to regulate the voltage of the low-voltage side LP once or more than once (in a continuous manner), so that the voltage of the low-voltage side LP is compensated to be within a rated voltage range. The monitoring terminal 113 is coupled to the detecting module 1111, so as to collect the operation status data of the transformer body 111 and generate an abnormal status message based on the operation status data. The abnormal status message can include an abnormal electrical load status or an overload status of the transformer body 111. Moreover, the monitoring terminal 113 is configured to transmit the operation status data or the abnormal status message to the backend management system 12 through the communication infrastructure 22.

Preferably, the voltage regulator 112 performs active voltage compensation at a predetermined regulation of not greater than 5%, so that an aimed voltage (a rated voltage) is set within a ±1% range of the rated voltage (e.g., 220 V). For example, when the voltage detected by the detecting module 1111 is 208 V, said voltage can be up-regulated to 220 V by the voltage regulator 112 at a regulation of 5%. If the compensated voltage is still not within the rated voltage range, the voltage regulator 112 will perform another voltage compensation. That is, even if the voltage variations of the transmission and distribution network 21 are caused by reasons such as grid connection of renewable energy, a voltage of a feeder line can still be continuously compensated by the voltage regulator 112 to reach the rated voltage, so as to maintain the electric power quality of the feeder line.

Although only the smart regulating transformers 11 are shown in FIG. 1 and FIG. 2, traditional transformers (transformers that do not have the active voltage compensation function) can also be applied to the transformer monitoring management system 1 of the present disclosure and monitored by the backend management system 12.

It should be noted that, by monitoring the operation status data (e.g., the voltage and the current) of the transformer body 111 via the backend management system 12, electrical load characteristics of electricity usage in different areas can be learned, and an electrical load status or the overload status of the transformer body 111 can be accurately estimated. In this way, area planning of the transformer can become more complete. For example, the required transformer capacity, quantity, or type/model can be arranged according to the electrical load characteristics of electricity usage in the area, so that a shortened service life or even accidents (e.g., power outage accidents) caused by the transformer body 111 being in the abnormal electrical load status or the overload status for a long period of time can be prevented.

In the present disclosure, the monitoring terminal 113 is also coupled to the voltage regulator 112 to collect voltage regulation data, and the voltage regulation data includes values before and after the voltage regulation. In addition, the monitoring terminal 113 transmits the voltage regulation data to the backend management system 12 through the communication infrastructure 22, so as to quickly obtain actual statuses of the voltage variation and the voltage compensation.

Figure 8:
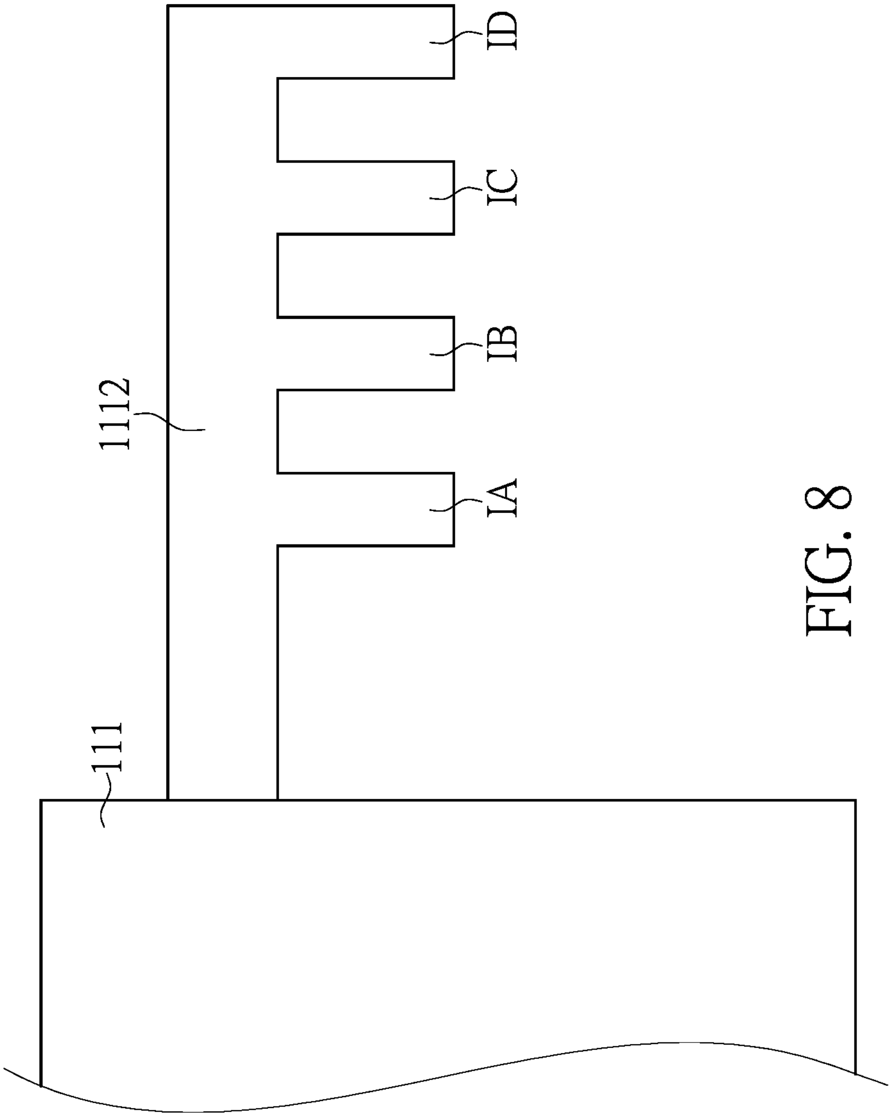
FIG. 8 is a partial schematic diagram illustrating a transformer body of the smart regulating transformer of the transformer monitoring management system according to the present disclosure.

Reference is made to FIG. 2, which is to be read in conjunction with FIG. 8. In some embodiments, the detecting module 1111 can obtain a temperature of a copper head

1112 of the transformer body 111. Since the temperature of the copper head 1112 is in positive correlation with an electrical load current, the abnormal status message generated by the monitoring terminal 113 based on the operation status data of the transformer body 111 can include an amount of an overload current or an overload ratio of the transformer body 111. According to practical requirements, when the temperature of the copper head 1112 is detected to exceed a warning value, the backend management system 12 can emit a warning to remind the related personnel. Furthermore, according to an output current of each contact IA, IB, IC, ID of the copper head 1112, the user 3 that has high electricity usage can be located, so as to solve the overload problem of the transformer body 111 (e.g., suggesting the user 3 to apply for a private line).

In some embodiments, the transformer body 111 is a main body of an oil-immersed distribution transformer, and the detecting module 1111 can obtain an oil temperature of an insulating oil inside the transformer body 111, so that the abnormal status message generated by the monitoring terminal 113 based on the operation status data of the transformer body 111 can include an abnormal oil temperature status of the transformer body 111. It should be noted that an overly high oil temperature may accelerate insulation aging, thereby causing insulation breakdown. As such, by monitoring the oil temperature of the transformer body 111 via the backend management system 12, the service life can be prevented from being quickly shortened due to the transformer body 111 being in a high-temperature overload status for a long period of time, and damage to or explosion of an insulation device of the transformer body 111 can be avoided.

In some embodiments, the transformer body 111 is the main body of the oil-immersed distribution transformer, and the detecting module 1111 can obtain an oil level of the insulating oil inside the transformer body 111, so that the abnormal status message generated by the monitoring terminal 113 based on the operation status data of the transformer body 111 can include an abnormal oil level status of the transformer body 111. It should be noted that a leakage problem of the transformer body 111 may result in poor insulation performance, insulation breakdown, and internal short-circuiting, burning, or even explosion. As such, by monitoring the oil level of the transformer body 111 via the backend management system 12, damage to the environment or people caused by external leakage of the insulating oil can be prevented, so as to ensure safe operation of the transformer body 111.

In practice, the detecting module 1111 can be completely configured before shipment of the transformer body 111. The detecting module 1111 can include a plurality of sensing elements for respectively sensing the voltage, the current, the temperature of the copper head, the oil temperature, and the oil level of the transformer body 111. Each of the sensing elements can be a sensor, a sensing chip, or a sensing circuit, but is not limited thereto. The monitoring terminal 113 can be a transformer terminal unit for collecting each piece of sensor data. For the data that exceeds the warning value, the monitoring terminal 113 generates and transmits the abnormal status message to the backend management system 12, so as to quickly grasp an abnormal status of the transformer.

According to practical requirements, upon receipt of the abnormal status message sent by the monitoring terminal 113, the backend management system 12 can activate a reporting operation. In this way, the related personnel are able to timely discover and identify the abnormality of the transformer, so that appropriate measures can be taken before accidents happen.

Figure 3:
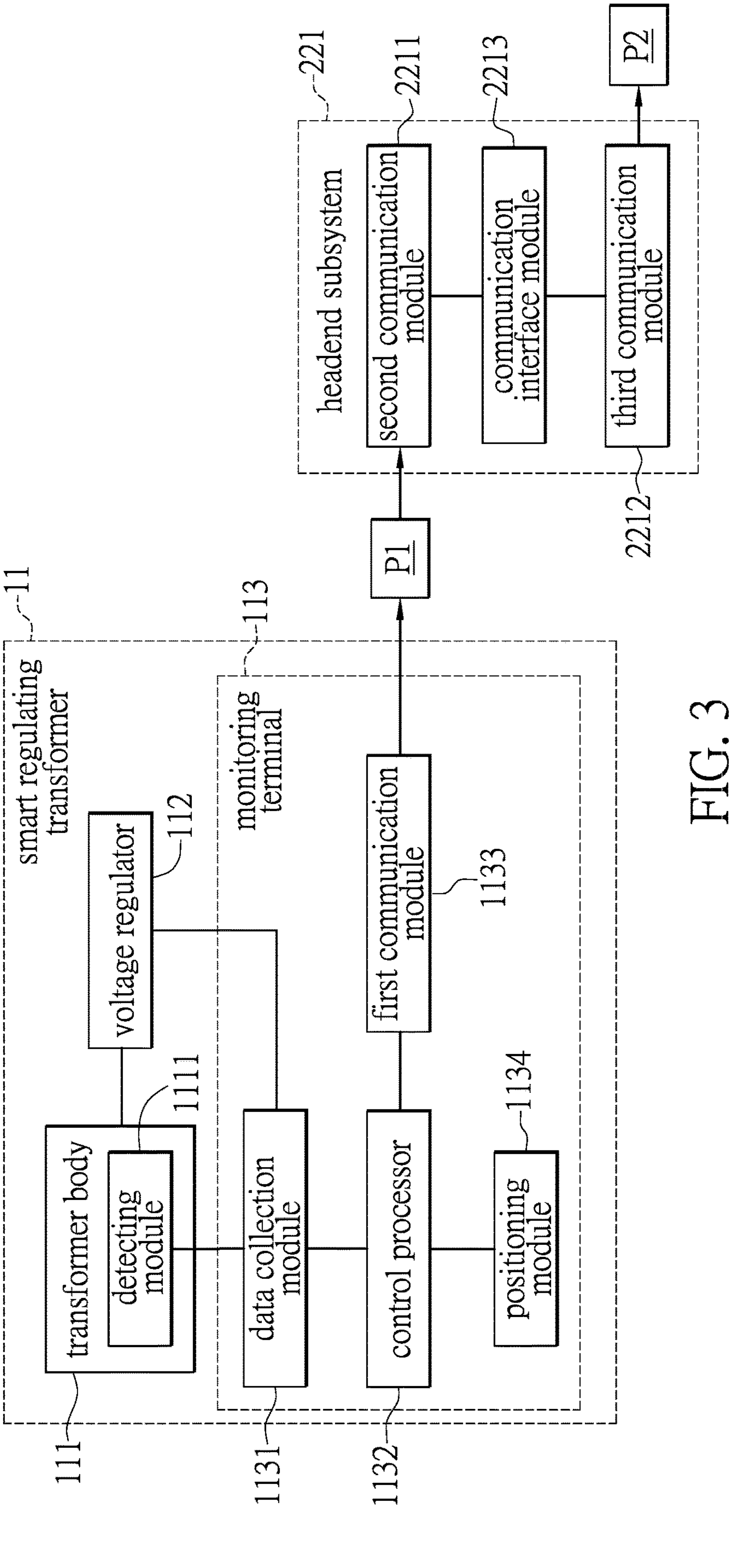
FIG. 3 is a schematic diagram illustrating a partial structure of the transformer monitoring management system according to the present disclosure.

Reference is made to FIG. 3. The monitoring terminal 113 includes a data collection module 1131, a control processor 1132, and a first communication module 1133. The data collection module 1131 can be a data collector or a data collection software or program that periodically collects each piece of sensor data of the detecting module 1111. The control processor 1132 can be a data processor, a data processing chip, a data processing circuit, or a processing software or program that sets the warning value for each piece of sensor data and determines whether or not the warning value is exceeded. If a value of a specific piece of data (e.g., the voltage, the current, the temperature of the copper head, the oil temperature, or the oil level) exceeds the preset warning value, the control processor 1132 at once generates a corresponding one of the abnormal status message. The first communication module 1133 can be a communicator, a communication chip, a communication circuit, a communication interface, or a communication software or program. For each piece of sensor data or the abnormal status message, the first communication module 1133 performs data transmission based on a first communication protocol P1 used by the communication infrastructure 22, such as a P1 interface protocol (device language message specification (DLMS)) of the advanced metering infrastructure (AMI). According to practical requirements, the monitoring terminal 113 can further include a positioning module 1134 to obtain a position message of the transformer body 111, and the position message is transmitted to the backend management system 12 through the first communication module 1133.

In some embodiments, the communication infrastructure 22 includes a headend subsystem 221, and the headend subsystem 221 includes a second communication module 2211, a third communication module 2212, and a communication interface module 2213. The second communication module 2211 can establish a communicative connection with the first communication module 1133 via a wireless network, so that the operation status data and relevant messages of the transformer body 111 can be transmitted between the monitoring terminal 113 and the headend subsystem 221 based on the first communication protocol P1. The wireless network can be narrowband internet of things (NB-IoT), fourth-generation (4G) mobile communication networks, or fifth-generation (5G) mobile communication networks. The third communication module 2212 can convert data and messages from the monitoring terminal 113 into formats that meet a second communication protocol P2 used by the communication infrastructure 22, and transmit the same to the backend management system 12. That is, data transmission is performed based on the second communication protocol P2, such as a P6 interface protocol (IEC 61968) of the advanced metering infrastructure (AMI). The second communication module 2211 and the third communication module 2212 can each be a communicator, a communication chip, a communication circuit, a communication interface, or a communication software or program. The communication interface module 2213 can execute an interface program for integration of the first communication protocol P1 and the second communication protocol P2.

Figure 4:
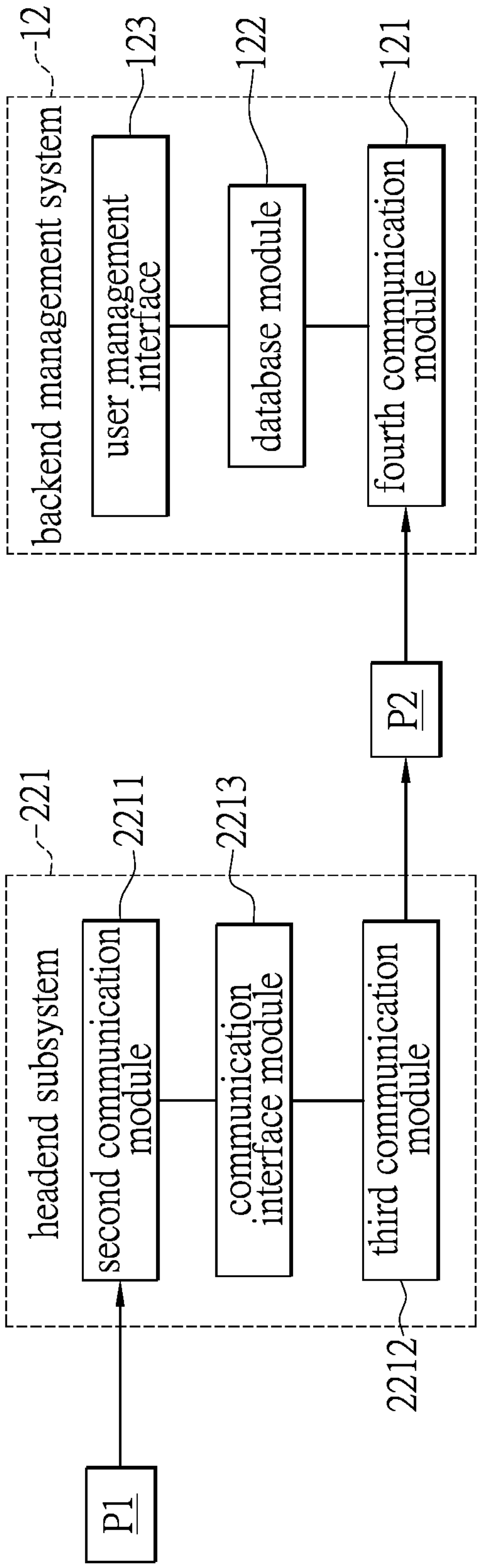
FIG. 4 is a schematic diagram illustrating another partial structure of the transformer monitoring management system according to the present disclosure.
Figure 7:
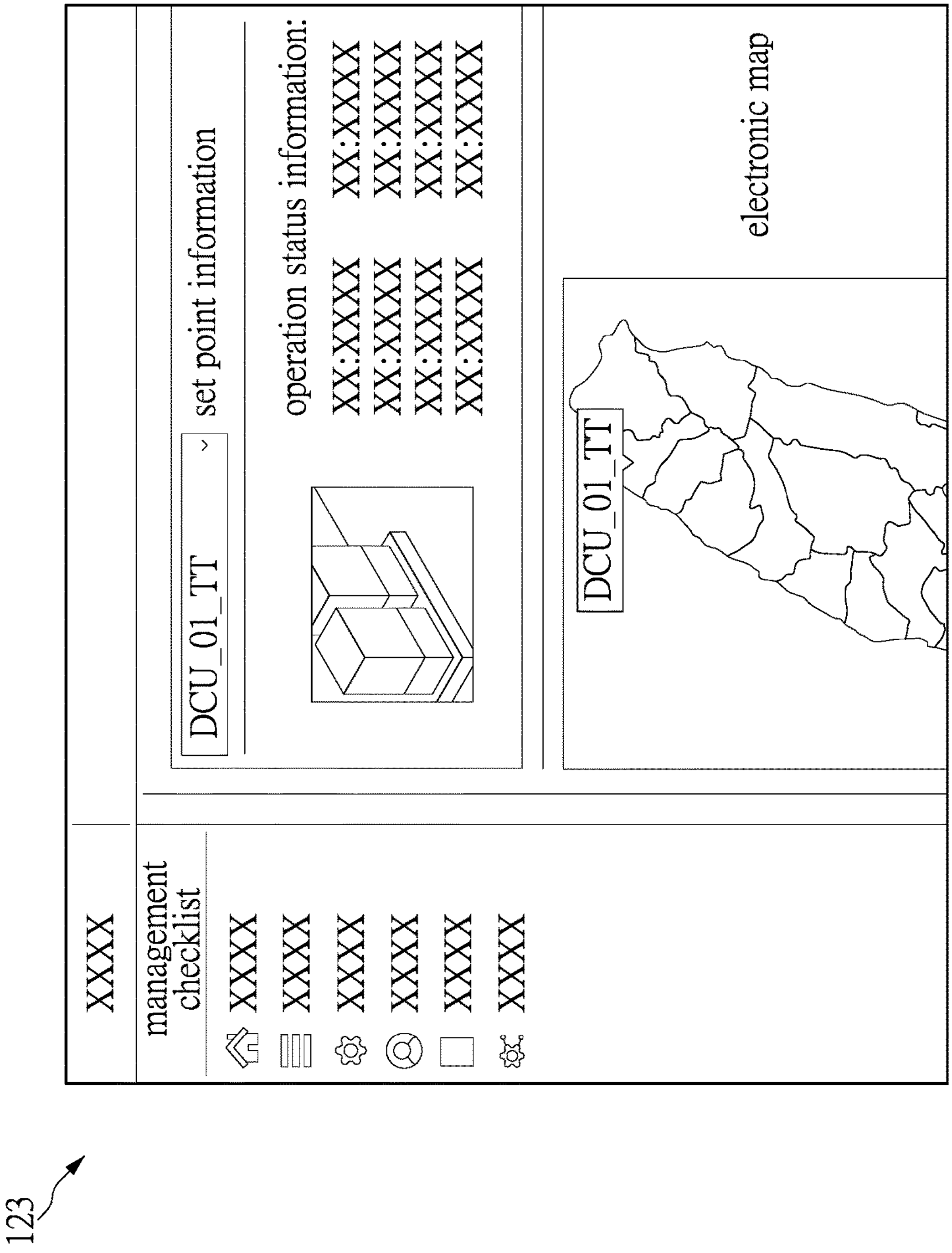
FIG. 7 illustrates a user management interface of a backend management system of the transformer monitoring management system according to the present disclosure.

Referring to FIG. 4 and FIG. 7, the backend management system 12 includes a fourth communication module 121 and a database module 122. The fourth communication module 121 can establish a communicative connection with the third communication module 2212 via the internet, so as to receive the data and the messages from the monitoring terminal 113 based on the second communication protocol P2. The fourth communication module 121 can be a communicator, a communication chip, a communication circuit, a communication interface, or a communication software or program. The database module 122 is configured to store the data and the messages from the monitoring terminal 113 for easy look-up, management, use, or provision to other systems. The database module 122 can be a hard disk (e.g., a file-hosting or cloud-storage service), a memory, a memory card, or a database. According to practical requirements, the backend management system 12 can further include a user management interface 123, so as to display the operation status data of the transformer body 111 and an electronic map (e.g., a geographic information system (GIS) map). The operation status data includes real-time data and historical data. Topology information of relevant feeder lines, which includes a main topology and a branched topology, can be illustrated on the electronic map, and the position of the transformer body 111 is labelled. On this basis, potential causes of malfunction can be detected by big data analytics, and a typical pattern for occurrence of malfunction can be established in the future.

[Beneficial Effects of the Embodiments]

In conclusion, in the transformer monitoring management system provided by the present disclosure, by virtue of "the voltage regulator being coupled to the low-voltage side of the transformer body and adopting the predetermined regulation to regulate the voltage of the low-voltage side once or more than once, so that the voltage of the low-voltage side is compensated to be within the rated voltage range," "the monitoring terminal being coupled to the detecting module of the transformer body, so as to collect the operation status data of the transformer body obtained by the detecting module and generate the abnormal status message," and "the monitoring terminal being configured to transmit the operation status data or the abnormal status message to the backend management system through the communication infrastructure," maintenance efficiency for operation of the transformer can be improved, and effectiveness of the communication infrastructure can be maximized.

In addition, the monitoring terminal can transmit the operation status data (i.e., monitoring data) of the transformer to the backend management system in a manner that is compatible with a communication standard or data transmission of the communication infrastructure (e.g., an advanced metering infrastructure), so as to remotely monitor operation status changes of the transformer in real time and instantly and preliminarily determine causes of abnormality. In this way, when operation of the transformer is abnormal, a maintenance time or a troubleshooting time can be shortened, thereby preventing damage to the transformer body and avoiding occurrence or expansion of the damage.

Furthermore, the backend management system can manage and process a substantial amount of long-term data from different transformer bodies, and can gradually establish a monitoring data database of the transformer body, so that a device status of the transformer body can be fully grasped. In the future, possible causes of malfunction can also be detected by big data analytics, and a fault mode curve can be established, so as to achieve the goal of trend-driven management.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A transformer monitoring management system, which is applicable to a smart gird that includes a transmission and distribution network and a communication infrastructure, the transformer monitoring management system comprising:

a plurality of smart regulating transformers; and a backend management system;

wherein each one of the smart regulating transformers includes:

a transformer body, wherein the transformer body has a high-voltage side and a low-voltage side, and the high-voltage side is coupled to the transmission and distribution network; wherein a detecting module is disposed on the transformer body to obtain operation status data of the transformer body, and the operation status data includes a voltage and a current of the low-voltage side;

a voltage regulator, wherein the voltage regulator is coupled to the low-voltage side, and adopts a predetermined regulation to regulate the voltage of the low-voltage side once or more than once, so that the voltage of the low-voltage side is compensated to be within a rated voltage range; and a monitoring terminal, wherein the monitoring terminal is coupled to the detecting module, so as to collect the operation status data and generate an abnormal status message based on the operation status data; wherein the abnormal status message includes an abnormal electrical load status or an overload status of the transformer body;

wherein the monitoring terminal in each one of the smart regulating transformers is configured to transmit the operation status data or the abnormal status message to the backend management system through the communication infrastructure.

2. The transformer monitoring management system according to claim 1, wherein the predetermined regulation is not greater than 5%, and the rated voltage range is within +1% of a rated voltage.

3. The transformer monitoring management system according to claim 1, wherein the monitoring terminal is coupled to the voltage regulator to collect voltage regulation data, and transmits the voltage regulation data to the backend management system through the communication infrastructure.

4. The transformer monitoring management system according to claim 1, wherein, in each one of the smart regulating transformers, the operation status data obtained by the detecting module further includes a temperature of a copper head of the transformer body, and the abnormal status message generated by the monitoring terminal based on the operation status data further includes an amount of an overload current or an overload ratio of the transformer body.

5. The transformer monitoring management system according to claim 1, wherein, in each one of the smart regulating transformers, the transformer body includes an insulating oil, and the operation status data obtained by the detecting module further includes an oil temperature of the insulating oil; wherein the abnormal status message generated by the monitoring terminal based on the operation status data further includes an abnormal oil temperature status of the transformer body.

6. The transformer monitoring management system according to claim 5, wherein the operation status data obtained by the detecting module further includes an oil level of the insulating oil, and the abnormal status message generated by the monitoring terminal based on the operation status data further includes an abnormal oil level status of the transformer body.

7. The transformer monitoring management system according to claim 1, wherein the backend management system is configured to activate a reporting operation based on the abnormal status message.

8. The transformer monitoring management system according to claim 1, wherein the monitoring terminal in each one of the smart regulating transformers includes a first communication module, the communication infrastructure includes a headend subsystem, the headend subsystem includes a second communication module and a third communication module, and the backend management system includes a fourth communication module; wherein a first communication protocol and a second communication protocol that is different from the first communication protocol are implemented in the communication infrastructure, the first communication module of the monitoring terminal in each one of the smart regulating transformers communicates with the second communication module of the headend subsystem based on the first communication protocol, and the third communication module of the headend subsystem communicates with the fourth communication module of the backend management system based on the second communication protocol.

9. The transformer monitoring management system according to claim 1, wherein the backend management system is configured to display the operation status data and position messages of the transformer bodies on an electronic map.

10. The transformer monitoring management system according to claim 1, wherein the monitoring terminal in each one of the smart regulating transformers includes a positioning module, so as to obtain a position message of the transformer body.

* * * * *